United States Patent
Fukushima et al.

(10) Patent No.: US 9,604,250 B2
(45) Date of Patent: Mar. 28, 2017

(54) REFINISH COATING SYSTEM AND REPAIRING METHOD FOR AUTOMOTIVE RESIN GLAZING

(71) Applicants: Shin-Etsu Chemical Co., Ltd., Tokyo (JP); KABUSHIKI KAISHA TOYOTA JIDOSHOKKI, Kariya-shi, Aichi-ken (JP)

(72) Inventors: Motoo Fukushima, Annaka (JP); Yukimasa Aoki, Annaka (JP); Masahiro Yoshizawa, Annaka (JP); Koichi Chigita, Kariya (JP); Yuya Maruyama, Kariya (JP); Hidenori Munekata, Kariya (JP)

(73) Assignees: SHIN-ETSU CHEMICAL CO., LTD., Tokyo (JP); KABUSHIKI KAISHA TOYOTA JIDOSHOKKI, Kariya-Shi (JP)

( * ) Notice: Subject to any disclaimer, the term of this patent is extended or adjusted under 35 U.S.C. 154(b) by 0 days.

(21) Appl. No.: 14/544,000

(22) Filed: Nov. 18, 2014

(65) Prior Publication Data
US 2015/0140345 A1    May 21, 2015

(30) Foreign Application Priority Data
Nov. 19, 2013 (JP) .................................. 2013-238812

(51) Int. Cl.
| | | |
|---|---|---|
| B05D 5/00 | (2006.01) | |
| C09D 183/04 | (2006.01) | |
| B05D 7/14 | (2006.01) | |
| B05D 7/00 | (2006.01) | |
| B05D 1/36 | (2006.01) | |
| C09D 5/00 | (2006.01) | |
| C08J 7/04 | (2006.01) | |
| C08K 3/36 | (2006.01) | |
| C08K 5/52 | (2006.01) | |
| C08G 77/16 | (2006.01) | |

(52) U.S. Cl.
CPC ............... *B05D 5/005* (2013.01); *B05D 1/36* (2013.01); *B05D 7/14* (2013.01); *B05D 7/52* (2013.01); *B05D 7/53* (2013.01); *C08J 7/04* (2013.01); *C08K 3/36* (2013.01); *C08K 5/52* (2013.01); *C09D 5/00* (2013.01); *C09D 5/002* (2013.01); *C09D 183/04* (2013.01); *B05D 2518/10* (2013.01); *B05D 2518/12* (2013.01); *C08G 77/16* (2013.01); *Y10T 428/31663* (2015.04)

(58) Field of Classification Search
CPC . B05D 1/36; B05D 5/005; B05D 7/14; B05D 7/52; B05D 7/53; B05D 2518/10; B05D 2518/12
USPC ....... 427/140, 142, 256, 258, 261, 270, 271, 427/402, 407.1
See application file for complete search history.

(56) References Cited

U.S. PATENT DOCUMENTS

| | | |
|---|---|---|
| 6,677,047 B2 | 1/2004 | Matsumura et al. |
| 6,855,768 B2 | 2/2005 | Matsumura et al. |
| 8,211,546 B2 | 7/2012 | Fukushima et al. |
| 2011/0034626 A1 | 2/2011 | Fukushima et al. |
| 2012/0058347 A1 | 3/2012 | Fukushima et al. |
| 2012/0196967 A1* | 8/2012 | Iwao ....................... C08G 18/10 524/379 |

FOREIGN PATENT DOCUMENTS

| | | |
|---|---|---|
| EP | 2426175 A1 | 3/2012 |
| EP | 2 607 413 A1 * | 6/2013 |
| EP | 2 607 413 A1 | 6/2013 |
| JP | 63-168470 A | 7/1988 |
| JP | 2001-11379 A | 1/2001 |
| JP | 2001-214122 A | 8/2001 |
| JP | 2011-37969 A | 2/2011 |
| JP | 2012-56098 A | 3/2012 |

OTHER PUBLICATIONS

Extended European Search Report issued Apr. 1, 2015, in European Patent Application No. 14193620.3.

* cited by examiner

*Primary Examiner* — William Phillip Fletcher, III
(74) *Attorney, Agent, or Firm* — Birch, Stewart, Kolasch & Birch, LLP (57) ABSTRACT

Disclosed is a method for repairing a damaged area of a silicone hard-coat layer on an automotive resin glazing substrate by applying an intermediate coating composition (I) to the damaged area and applying a topcoat coating composition (II) to the intermediate coating composition. The intermediate coating composition (I) contains (A) a reactive siloxane compound and (B) silica. The topcoat coating composition (II) contains (C) an alkoxysilane having a UV-absorbing functional group, (D) a multifunctional alkoxysilane, (E) a reactive siloxane compound, (F) colloidal silica, and (G) phosphoric acid. The method forms a coating having the same appearance and physical properties as the underlying silicone hard-coat layer.

6 Claims, 1 Drawing Sheet

REFINISH COATING SYSTEM AND REPAIRING METHOD FOR AUTOMOTIVE RESIN GLAZING

CROSS-REFERENCE TO RELATED APPLICATION

This non-provisional application claims priority under 35 U.S.C. §119(a) on Patent Application No. 2013-238812 filed in Japan on Nov. 19, 2013, the entire contents of which are hereby incorporated by reference.

TECHNICAL FIELD

This invention relates to an automotive resin glazing refinish coating system and an automotive resin glazing repairing method. More particularly, it relates to an automotive resin glazing refinish coating system for repairing a silicone hard coat layer formed on a plastic substrate via a primer coating, and an automotive resin glazing repairing method using the refinish coating system.

BACKGROUND ART

Nowadays, lightweight, non-shattering, transparent resin materials are widely used as a substitute for transparent flat glass. For example, plastic substrates, especially polycarbonate resins, due to their excellent properties including transparency, impact resistance, and heat resistance, are currently used as structural members in place of glass, in various applications including windows in vehicles and buildings, meter covers and the like. However, it is strongly desired to improve the surface properties of plastic substrates, typically polycarbonate resins because their surface properties like mar resistance and weatherability are inferior to glass.

Known means for improving the mar resistance of molded polycarbonate resins is by coating the surface of a resin substrate with a thermosetting resin such as organopolysiloxane. Known means for improving weatherability is by covering the surface of a resin substrate with a weather-resistant resin layer containing a UV absorber. Coating compositions known to form surface protective films for the purpose of imparting high hardness and mar resistance to the resin substrate surface include a composition comprising a hydrolyzate or partial hydrolyzate of hydrolyzable organosilane and a composition comprising the hydrolyzate or partial hydrolyzate and colloidal silica as described in JP-A S63-168470. As the coating composition having excellent UV resistance to be applied to automotive glazing plastic substrates, JP-A 2011-037969 and JP-A 2012-056098 disclose a coating system comprising a hard coat coating agent comprising a hydrolyzate of UV-absorbing organoalkoxysilane and/or partial condensate thereof and colloidal silica in combination with an acrylic resin primer having improved UV resistance, and a coating method using such a combination.

One practice for coating a plastic substrate with a silicone coating agent is by flow coating a primer, then coating and curing a silicone hard coat paint of heat cure type thereto to form a coating film.

Such hard coat films have a high hardness enough to impart mar resistance to the substrate for protection, but lack toughness, allowing a multilayer thick film to readily crack in response to sharp temperature changes during heat curing or outdoor service. Another drawback is that the hard coat film will crack during long-term outdoor service because it cannot conform to changes with time of the substrate or primer layer caused by UV, acid, base, water and other factors. In such cases, where the plastic substrate has a silicone coating thereon, one prior art approach for repairing cracks or defects in a damage area of a coating is by stripping off the original coating around the damage area and applying a topcoat paint thereto again.

Also, if the coating layer in the coating step includes thickness variations or has deposits or foreign particles thereon, repair is carried out by removing the relevant coating layer portion by such means as grinding, and coating refinish paint thereon. Since it is difficult to form a silicone layer directly on the surface of a once cured silicone film in a tight bond, a primer layer capable of tight bonding must be previously formed. Thus, the process becomes cumbersome and time-consuming. In repairing a defective portion of a coating caused by cracks and coating variations, the original coating formed by flow coating and a refinish coating on the defective portion formed by manual air spraying may differ in the cured state. In such a case, the refinish coating on the defective portion may not have the luster appearance of the original coating, presenting a strange appearance.

CITATION LIST

Patent Document 1: JP-A S63-168470
Patent Document 2: JP-A 2011-037969 (U.S. Pat. No. 8,211,546)
Patent Document 3: JP-A 2012-056098 (US 20120058347, EP 2426175)

DISCLOSURE OF INVENTION

An object of the invention is to provide an automotive resin glazing refinish coating system for repairing a multilayer film comprising a plastic substrate, a primer coating, and a silicone hard coat layer, which enables to form another silicone hard coat layer directly on the silicone hard coat layer in a tight bond such that the two silicone hard coat layers may be substantially equivalent in outer appearance, transparency, mar resistance, and adhesion; and an automotive resin glazing repairing method using the refinish coating system.

The inventors have found that when an underlying refinish coating is formed on a (defective) silicone hard coat layer on an automotive resin glazing substrate from an intermediate coating composition comprising silica and a reactive siloxane compound, and a room temperature-curable topcoat coating composition is coated thereon to form an overlying coating, the resultant coating covers and hide the flaw or damage including irregularities. Specifically, a refinish coating system comprising an intermediate coating composition and a topcoat coating composition is useful for repairing a damage area of a silicone hard coat layer on an automotive resin glazing substrate. More specifically, by applying the intermediate coating composition comprising silica and a reactive siloxane compound having an alkoxysilyl group and applying the room temperature-curable hard coat coating composition (or topcoat coating composition) containing a phosphoric acid-based cure catalyst thereon, a coating is formed which is excellent in transparency, mar resistance, and adhesion and has weather resistance enough to minimize degradation during long-term outdoor exposure.

In one aspect, the invention provides a refinish coating system for repairing a damage area of a silicone hard coat layer on an automotive resin glazing substrate, comprising (I) an intermediate coating composition and (II) a topcoat coating composition to be coated thereon, the intermediate coating composition (I) comprising (A) 100 parts by weight of a reactive siloxane compound and (B) 1 to 50 parts by weight of silica, the topcoat coating composition (II) comprising (C) 1 to 25 parts by weight of an alkoxysilane having a UV-absorbing functional group, (D) 20 to 70 parts by weight of a multifunctional alkoxysilane, (E) 20 to 70 parts by weight of a reactive siloxane compound, (F) 1 to 50 parts by weight of colloidal silica, and (G) 0.5 to 20 parts by weight of phosphoric acid, per 100 parts by weight of components (C) to (G) combined.

In a preferred embodiment, component (A) is an alkoxysiloxane having the average compositional formula (1):

wherein $R^1$ is each independently a substituted or unsubstituted $C_1$-$C_{10}$ alkyl group or aryl group, $R^2$ is a monovalent hydrocarbon group of 1 to 6 carbon atoms, b, c and d are numbers meeting the range: $1 \leq b < 2$, $0.1 \leq c \leq 3$, $0 \leq d < 0.5$, and $1.1 \leq b+c+d \leq 4$, and component (B) is fumed silica having a BET specific surface area of 100 to 400 m²/g.

In another preferred embodiment, component (C) is an alkoxysilane having the formula (2):

wherein Z is a $C_2$-$C_6$ alkylene group, $R^3$ and $R^4$ are each independently a $C_1$-$C_5$ alkyl group, Y is each independently hydrogen, $C_1$-$C_{10}$ alkyl group, $C_6$-$C_{10}$ aryl group, hydroxyl group or halogen atom, and a is 0 or 1, component (D) is an alkoxysilane having the formula (3):

wherein $R^5$ is each independently a substituted or unsubstituted, monovalent hydrocarbon group of 1 to 10 carbon atoms, $R^6$ is each independently a $C_1$-$C_5$ alkyl group, e and f are numbers meeting the range: $0 \leq e \leq 2$, $2 \leq f \leq 4$, and $e+f=4$, and component (E) is a siloxane compound having the formula (4):

wherein $R^7$ is each independently a substituted or unsubstituted $C_1$-$C_{10}$ alkyl group or aryl group, $R^8$ is a monovalent hydrocarbon group of 1 to 6 carbon atoms, g, h and i are numbers meeting the range: $1 \leq g < 2$, $0.1 \leq h \leq 3$, $0 \leq i < 0.5$, and $1.1 \leq g+h+i \leq 4$.

In another aspect, the invention provides a method for repairing a damage area of a silicone hard coat layer on an automotive resin glazing substrate, using the refinish coating system defined above, the method comprising the steps of applying the intermediate coating composition to the damage area for burying irregularities in the damage area, removing any extra of the intermediate coating composition, applying the topcoat coating composition thereon, and curing both the coating compositions.

Typically, the silicone hard coat layer is formed of a hard coat composition comprising a polysiloxane obtained from hydrolytic condensation of at least one hydrolyzable silicon compound having the formula (i):

wherein R' is a monovalent organic group of 1 to 18 carbon atoms, X' is a hydrolyzable group, and p is an integer of 0 to 2, with the proviso that solely p=0 and solely p=2 are excluded, a mixture of said polysiloxane and a microparticulate metal oxide, a polysilazane obtained from reaction of at least one hydrolyzable silicon compound having the formula (ii):

wherein R" is a monovalent organic group of 1 to 18 carbon atoms, X" is a hydrolyzable group, and q is an integer of 0 to 2, with ammonia, or a mixture of said polysilazane and a microparticulate metal oxide.

ADVANTAGEOUS EFFECT OF INVENTION

According to the invention, a damage area of a silicone hard coat layer on an automotive glazing resin substrate is repaired by applying the intermediate coating composition to the damage area for burying irregularities, wiping off any extra of the intermediate coating composition so as to be flush with the hard coat layer, and applying the topcoat coating composition thereon. As the refinish coating system, two compositions are applied on the silicone hard coat layer in an overlapping manner, thereby forming a two-layer coating having outer appearance and physical properties equivalent to the original silicone hard coat layer. Since the coating is obtained without forming a primer layer again, the process eliminates cumbersome operation, facilitates repair operation, and achieves repair operation with a finish devoid of variations.

DESCRIPTION OF PREFERRED EMBODIMENTS

As used herein, "refinish" refers to compositions and processes used in the repair of a damaged automotive resin glazing. The terms "refinish coating" and "repair coating" are used interchangeably. The term "(meth)acrylic" is intended to mean acrylic or methacrylic. The notation (Cn—Cm) means a group containing from n to m carbon atoms per group.

The invention relates to a refinish coating system for repairing a damage area of a silicone hard coat layer on an automotive resin glazing substrate. More specifically, it relates to a refinish coating system and a repair method for repairing a damage area of a silicone hard coat layer formed on an automotive resin glazing substrate via a primer layer.

The refinish coating system for automotive resin glazing according to the invention is defined as comprising (I) an intermediate coating composition and (II) a topcoat coating composition to be coated thereon, the intermediate coating composition (I) comprising (A) 100 parts by weight of a reactive siloxane compound and (B) 1 to 50 parts by weight of silica, the topcoat coating composition (II) comprising (C) 1 to 25 parts by weight of an alkoxysilane having a UV-absorbing functional group, (D) 20 to 70 parts by weight of a multifunctional alkoxysilane, (E) 20 to 70 parts by weight of a reactive siloxane compound, (F) 1 to 50 parts by weight of colloidal silica, and (G) 0.5 to 20 parts by weight of phosphoric acid, per 100 parts by weight of components (C) to (G) combined.

Provided that a coated structure comprising a primer layer and a silicone hard coat layer stacked on a plastic substrate is damaged (i.e., has a crack or flaw), the refinish coating method using the refinish coating system involves the steps of applying the intermediate coating composition to the damage area to bury irregularities, removing any extra of the intermediate coating composition so as to be flush with the hard coat layer, and applying the topcoat coating composition thereon.

Now the components of the compositions are described in detail.

(I) Intermediate Coating Composition

The intermediate coating composition (I) comprises (A) 100 parts by weight of a reactive siloxane compound and (B) 1 to 50 parts by weight of silica.

(A) Reactive Siloxane Compound

The reactive siloxane compound used herein is a multifunctional alkoxysiloxane. It functions to improve anchorage of silica within the intermediate coating composition and adhesion of the intermediate coating composition to the topcoat coating composition. Specifically, it is an alkoxy-containing siloxane having the average compositional formula (1):

$$R^1{}_b\text{—Si}(OR^2)_c(OH)_dO_{(4-b-c-d)/2} \qquad (1)$$

wherein $R^1$ is each independently a substituted or unsubstituted $C_1$-$C_{10}$ alkyl group or aryl group, $R^2$ is a monovalent $C_1$-$C_6$ hydrocarbon group, b, c and d are numbers meeting the range: $1 \leq b < 2$, $0.1 \leq c \leq 3$, $0 \leq d < 0.5$, and $1.1 \leq b+c+d \leq 4$.

In formula (1), $R^1$ is an unsubstituted or substituted (especially halo-substituted) $C_1C_{10}$ alkyl group or aryl group. Examples include alkyl groups such as methyl, ethyl, propyl, butyl, hexyl, octyl and decyl, cycloalkyl groups such as cyclohexyl, and aryl groups such as phenyl and tolyl. Inter alia, alkyl groups are preferred for the intended application where mar resistance and weather resistance are required, with methyl being most preferred.

$R^2$ is a monovalent $C_1C_6$ hydrocarbon group such as alkyl, alkenyl or phenyl. The $(OR^2)$ group is a hydrolyzable group, specifically of 1 to 6 carbon atoms, typical examples of which are organoxy groups including methoxy, ethoxy, propoxy, butoxy, phenoxy, and isopropenoxy. Inter alia, $C_1$-$C_4$ alkoxy groups are preferred for reaction rate, easy operation, and easy distillation of by-products, with methoxy and ethoxy being most preferred.

The subscript b is a number in the range: $1 \leq b < 2$, preferably $1 \leq b < 1.5$. If $b<1$, the siloxane may cure to so high a crosslinking density that the coating may be susceptible to cracking. If $b \geq 2$, a sufficient hardness may not develop. The subscript c is a number in the range: $0.1 \leq c \leq 3$, preferably $0.5 \leq c \leq 2$. If $c<0.1$, cure and adhesion may be insufficient. If $c>3$, the siloxane may cure to so high a crosslinking density that the coating may be susceptible to cracking. The subscript d is a number in the range: $0 \leq d < 0.5$, preferably $0 \leq d < 0.2$. If $d \geq 0.5$, storage stability may worsen so that the coating composition may gel with the lapse of time or become difficult to apply due to a viscosity buildup.

The reactive siloxane compound (A) may be obtained from partial (co)hydrolytic condensation of a dialkoxysilane, trialkoxysilane, tetraalkoxysilane or a condensate thereof or a mixture thereof.

From the aspects of curability, surface hardness, crack resistance and adhesion-to-substrate of a refinish coating system, it is preferred that a trialkoxysilane and/or partial (co)hydrolytic condensate thereof account for at least 30 mol %, more preferably 40 to 100 mol % of component (A). Also preferably, a tetraalkoxysilane and/or partial (co)hydrolytic condensate thereof accounts for 0 to 40 mol % of component (A), and a dialkoxysilane and/or partial (co)hydrolytic condensate thereof accounts for 0 to 60 mol % of component (A). When the tetraalkoxysilane and/or partial (co)hydrolytic condensate thereof is blended as component (A) in addition to the trialkoxysilane and/or partial (co)hydrolytic condensate thereof, the surface hardness of a cured coating may become higher, but the coating becomes susceptible to cracking if the blending amount is too much. When the dialkoxysilane and/or partial (co)hydrolytic condensate thereof is blended in combination, a cured coating may be endowed with toughness and flexibility, with a risk that if the blending amount is too much, curability and crosslinking density become insufficient, resulting in a lower surface hardness.

Examples of the silane compound are alkylalkoxysilanes and arylalkoxysilanes including tetramethoxysilane, tetraethoxysilane, tetraisopropoxysilane, methyltrimethoxysilane, methyltriethoxysilane, methyltriisopropoxysilane, dimethyldimethoxysilane, diethyldiethoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, phenyltrimethoxysilane, phenyltriethoxysilane, phenyltriisopropoxysilane, phenyltriacetoxysilane, tolyltrimethoxysilane, and tolyltriethoxysilane. Also included are condensates of the foregoing, such as dimers and trimers. Of these silane compounds, those silane compounds having a substituent group selected from alkyl groups and a hydrolyzable group selected from methoxy and ethoxy are preferred in view of versatility and cost as well as curability, coating properties, function-imparting effect and storage stability of a silicone-based coating composition. Where a partial (co) hydrolytic condensate is desired, it may be obtained by reacting a silane compound with a necessary amount of water in the presence of an acid catalyst (e.g., acetic acid or hydrochloric acid) for thereby liberating the alcohol. A partial cohydrolytic condensate starting from two or more silane compounds may also be used.

On (co)hydrolysis, a hydrolytic catalyst may be used. The hydrolytic catalyst used herein may be selected from prior art well-known catalysts, for example, acidic hydrogen halides, carboxylic acids, and sulfonic acids, acidic or weakly acidic oxides and inorganic salts, and solid acids such as ion exchange resins. Other examples include organic acids such as acetic acid and maleic acid, and cation exchange resins having sulfonic or carboxylic acid groups on surface. The hydrolytic catalyst may be used in an amount of 0.001 to 10 moles per mole of the hydrolyzable group. Hydrolysis is preferably conducted under weakly acidic conditions, specifically in a range of pH 2 to 7. Unless hydrolysis is conducted under weakly acidic conditions, silanol groups being formed become unstable, allowing condensation reaction to proceed further to an extra molecular weight buildup.

The amount of water added for hydrolysis is 0.05 to 0.8 mole, preferably 0.1 to 0.5 mole per mole of the hydrolyzable group. Less than 0.05 mole of water may be insufficient for polymerization to progress. More than 0.8 mole of water may form more Si—OH groups, with a risk of gelation owing to intermolecular crosslinking.

As component (A), a partial (co)hydrolytic condensate of the foregoing silane compound may be used alone. It is also acceptable to use a partial cohydrolytic condensate of two or more silane compounds of different structure, or a mixture of two or more partial (co)hydrolytic condensates.

The reactive siloxane compound as component (A) should preferably have a viscosity at 25° C. of 5 to 500 mm$^2$/s, more preferably 10 to 200 mm$^2$/s, as measured by an Ostwald viscometer. A viscosity of less than 5 mm$^2$/s indicates too high a fluidity, with a possibility of flowing away from irregularities in a damage area of a coating. A viscosity in excess of 500 mm$^2$/s indicates poor penetration over irregularities in a coating damage area.

The reactive siloxane compound as component (A) should preferably have a weight average molecular weight (Mw) of 500 to 10,000, more preferably 1,000 to 5,000, as measured versus polystyrene standards by gel permeation chromatography (GPC). A Mw of less than 500 indicates too high a fluidity, with a possibility of flowing away from irregularities in a coating damage area. A Mw in excess of 10,000 corresponds to a high viscosity indicative of poor penetration over irregularities in a coating damage area.

In an embodiment wherein a partial (co)hydrolytic condensate consisting of methyltrimethoxysilane and/or methyltriethoxysilane units is essentially used as component (A), there is obtained an intermediate coating composition having an effective room-temperature cure behavior and a good balance of properties.

Component (B) is silica, that is, microparticulate silicon dioxide. Component (B) is deemed to play both the role of a filler for providing a coating with hardness and abrasion resistance and the role of a flaw-hiding agent for burying cracks in the damage area as refinish coating. Preferred is microparticulate silica produced by the flame hydrolysis technology, commonly known as fumed silica, since it is readily dispersible in component (A).

The method of producing microparticulate silica involves premixing a gaseous organohalosilane, a combustible gas capable of combusting to generate water vapor, and a free oxygen-containing gas, feeding the premix into a reaction chamber through a burner, and conducting flame hydrolysis. In this method, the amount of the combustible gas, the burner configuration, and the injection speed of the premix from the burner must meet a certain set of conditions. Also preferably, the amount of oxygen relative to the combustible gas and the burner configuration are adjusted to certain ranges. As long as these conditions are met during the production of silica using organohalosilane as the starting reactant, there is obtained microparticulate silica having a BET specific surface area of 100 to 400 m$^2$/g and a narrow primary particle size distribution, and capable of forming a molded silicone part with high transparency.

The starting organohalosilane is one having the following formula, but not limited thereto.

$$R_{4-m}SiX_m$$

Herein R is hydrogen, methyl, ethyl or phenyl, X is halogen such as chlorine, and m is an integer of 1 to 3, with the proviso that m=3 when R is phenyl, and not all R groups are hydrogen. Since the reactant must be fed to the burner in gaseous form, those having a boiling point of up to 250° C. are preferred. Suitable organohalosilanes include methyltrichlorosilane, methyldichlorosilane, trimethylchlorosilane, and dimethyldichlorosilane.

The combustible gas capable of combusting to generate water vapor ($H_2O$) is typically hydrogen although methane, propane and gaseous methanol may also be used. As the free oxygen-containing gas, on the other hand, air is most preferred for economy. For flame hydrolysis of the halosilane, a multi-tube burner is used. A premix of a gaseous organohalosilane, a combustible gas capable of combusting to generate water vapor, and a free oxygen-containing gas is fed to a reaction chamber through a burner where the organohalosilane is subjected to flame hydrolysis, followed by oxidation reaction to produce microparticulate silica.

The synthesis of silica from organohalosilane is represented by the following stoichiometric formula, which refers to methyltrichlorosilane as a typical organohalosilane.

$$CH_3SiCl_3 + 2O_2 \rightarrow SiO_2 + CO_2 + 3HCl$$

The formula indicates that water vapor is stoichiometrically unnecessary for the synthesis of silica from methyltrichlorosilane. In fact, the combustible gas capable of generating water vapor is unnecessary for the sole purpose of silica synthesis. However, for obtaining microparticulate silica having a minimal variation of primary particle size, a sufficient amount of water vapor to provide for hydrolysis of organohalosilane is necessary. This is because water vapor released by combustion of hydrocarbon which is functionality on the organohalosilane is unlikely to contribute to hydrolysis of organohalosilane, owing to a slow combustion rate. Inversely stated, it is presumed that enlargement of particles occurs because water vapor necessary for hydrolysis is short in proximity to the burner outlet. Accordingly, hydrogen featuring a high combustion rate is advantageously used. Water vapor also contributes to the provision of silica surface with active OH groups. The presence of combustible gas also plays the role of helping stable flame formation.

In a preferred example, the free oxygen-containing gas to be fed to the premix should contain an amount of oxygen which is by a factor of 1 to 2 greater than the sum of an equivalent amount of oxygen necessary to synthesize $SiO_2$ from $R_{4-k}SiO_{k/2}$ and an equivalent amount of oxygen necessary for combustion of the combustible gas.

This ensures that the free oxygen-containing gas must be mixed in a sufficient amount to eliminate any remains of carbon derived from the organohalosilane, and also plays the role of adjusting the flame temperature, as is well known in the art. In particular, it is known that the specific surface area of microparticulate silica is correlated to the flame temperature. Then microparticulate silica having the desired specific surface area can be synthesized while the flame temperature is adjusted in terms of the amount of heat generated by combustion of the organohalosilane and the combustible gas and the amount of the free oxygen-containing gas, typically air.

It is noted that the synthesis of microparticulate silica via flame hydrolysis of organohalosilane may be carried out by the standard technology as long as the above-mentioned conditions are met. That is, well-known conditions may be employed for the flame hydrolysis.

The size of silica particles is not particularly limited as long as a coating filled therewith remains transparent. Preferably silica particles have an average particle size ($d_{50}$) of 1 to 300 nm, more preferably 1 to 100 nm, the average particle size ($d_{50}$) being a volume basis 50% cumulative average particle diameter as measured by the laser diffraction scattering method. For the purpose of increasing dispersion stability of particles, silica particles may be partially treated or covered with a silane coupling agent, tetraalkoxysilane (e.g., tetraethoxysilane), titanium coupling agent, or carboxyl-containing organic polymer. Notably, the content of organic matter added for stabilization and used for coverage should preferably be limited to 10% by weight or less since the base of component (B) is inorganic silicon dioxide.

Component (B) is blended in an amount of 1 to 50 parts by weight, preferably 5 to 30 parts by weight per 100 parts by weight of component (A). Less than 1 part of component (B) fails to exert a hiding effect whereas more than 50 parts may cause ineffective processing upon application.

The intermediate coating composition (I) should preferably have a viscosity of 1,000 to 200,000 mPa·s, but is not limited thereto. Within this viscosity range, the composition will penetrate over irregularities in the coating damage area and will not flow away, fully exerting a coating damage-hiding effect.

(II) Topcoat Coating Composition

The topcoat coating composition (II) is defined as comprising the following components (C) to (G) as essential components:
 (C) an alkoxysilane having a UV-absorbing functional group,
 (D) a multifunctional alkoxysilane,
 (E) a reactive siloxane compound,
 (F) colloidal silica,
 (G) phosphoric acid, and optionally,
 (H) a solvent.

Component (C) is an alkoxysilane having a UV-absorbing functional group. Typically, it is a benzophenone alkoxysilane having the formula (2).

(2)

Herein Z is a $C_2$-$C_6$ alkylene group, $R^3$ and $R^4$ are each independently a $C_1$-$C_5$ alkyl group, Y is each independently hydrogen, $C_1$-$C_{10}$ alkyl group, $C_6$-$C_{10}$ aryl group, hydroxyl group or halogen atom, and a is 0 or 1.

The UV-absorbing alkoxysilane has in its molecule a benzophenone skeleton which contributes to UV absorption. The alkoxyl group at the molecular end is hydrolyzed to form a highly reactive silanol, which undergoes condensation polymerization to build up its molecular weight by itself, or bonds with another binder component.

A precursor to the benzophenone alkoxysilane as component (C) may be prepared as an allyloxybenzophenone by starting with a benzophenone having two or more hydroxyl groups and reacting it with an allyl halide.

The compound of formula (2) used as component (C) may be synthesized by reacting the allyloxybenzophenone with a hydrosilane compound in the presence of a platinum catalyst, optionally in an inert solvent such as toluene or tetrahydrofuran, or in a solventless system. The hydrosilane compound used herein is a hydrosilane compound having 1 to 3 methoxy, ethoxy, propoxy, butoxy or pentoxy groups per molecule. More preferred are trimethoxysilane and triethoxysilane. The reaction may be performed at a temperature in the range of room temperature to 150° C., preferably 25 to about 100° C. Where trimethoxysilane is used, the reaction may be performed at an elevated temperature of room temperature to about 60° C. and completed within about 30 minutes to about 2 hours.

For example, the UV-absorbing silane may be prepared as follows. First, dihydroxybenzophenone is reacted with allyl halide and potassium carbonate in a ketone-based organic solvent to form hydroxy-allyloxybenzophenone. This benzophenone is then reacted with hydroalkoxysilane in the presence of a platinum catalyst, to form hydroxy-(alkoxysilylalkoxy)benzophenone.

Component (C) is used in an amount of 1 to 25 parts by weight, preferably 5 to 20 parts by weight per 100 parts by weight of the sum of components (C) to (G). Less than 1 part of component (C) may lead to a lack of UV absorption and a shortage of adhesion. With more than 25 parts of component (C), no further improvement in the UV shielding effect is expectable, and the hardness and other properties of a cured coating may be degraded due to reduced contents of other components in the composition.

Component (D) is a multifunctional alkoxysilane. It serves to improve the flexibility and strength of a coating formed of a topcoat coating composition. Specifically it is an alkoxysilane of structure having the formula (3).

Herein $R^5$ is each independently an unsubstituted or substituted (especially halo-substituted), monovalent hydrocarbon group of 1 to 10 carbon atoms, $R^6$ is each independently a $C_1$-$C_5$ alkyl group, e and f are numbers meeting the range: $0 \le e \le 2$, $2 \le f \le 4$, and $e+f=4$.

Suitable groups represented by $R^5$ include alkyl, alkenyl and aryl groups, which are as exemplified above, e is preferably 1 or 2, and f is preferably 2 or 3.

Examples of the silane compound include tetramethoxysilane, tetraethoxysilane, tetraisopropoxysilane, methyltrimethoxysilane, methyltriethoxysilane, methyltriisopropoxysilane, dimethyldimethoxysilane, diethyldiethoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, phenyltrimethoxysilane, phenyltriethoxysilane, phenyltriisopropoxysilane, phenyltriacetoxysilane, tolyltrimethoxysilane, and tolyltriethoxysilane, which may be used alone or in admixture of two or more.

Of the foregoing silane compounds, those of formula (3) wherein $R^5$ is selected from methyl, ethyl, propyl and phenyl and $R^6$ is selected from methyl and ethyl are preferred in view of versatility and cost as well as curability, coating properties, function-imparting effect and storage stability of a silicone-based coating composition to which the silane compound is added. More preferred among others are dialkyldialkoxysilanes and diaryldialkoxysilanes corresponding to formula (3) wherein $e=f=2$. Most preferred are dimethyldimethoxysilane and dimethyldiethoxysilane.

Component (D) is used in an amount of 20 to 70 parts by weight per 100 parts by weight of the sum of components (C) to (G). Less than 20 parts of component (D) may lead to a low strength and hence, a lack of utility. With more than 70 parts of component (D), no further improvement in hardness is expectable, and the adhesion and UV shielding properties of a cured coating may be degraded due to reduced contents of other components in the composition.

Component (E) is a reactive siloxane compound. It serves to increase the strength of a coating formed of a composition. Specifically, it is a partial hydrolytic condensate of alkoxysilane, of structure having the formula (4).

$$R^7_g\!-\!Si(OR^8)_h(OH)_iO_{(4-g-h-i)/2} \quad (4)$$

Herein $R^7$ is each independently an unsubstituted or substituted (especially halo-substituted) $C_1$-$C_{10}$ alkyl group or aryl group, $R^8$ is a monovalent hydrocarbon group of 1 to 6 carbon atoms, g, h and i are numbers meeting the range: $1 \le g < 2$, $0.1 \le h \le 3$, $0 \le i < 0.5$, and $1.1 \le g+h+i \le 4$.

In formula (4), $R^7$ is an unsubstituted or substituted $C_1$-$C_{10}$ alkyl group or aryl group, examples of which include alkyl groups such as methyl, ethyl, propyl, butyl, hexyl, octyl, and decyl, cycloalkyl groups such as cyclohexyl, and aryl groups such as phenyl and tolyl. Inter alia, alkyl groups are preferred in the intended application where mar resistance and weather resistance are required, with methyl being most preferred.

$R^8$ is a monovalent $C_1$-$C_6$ hydrocarbon group such as alkyl, alkenyl or phenyl. The $(OR^8)$ group is a hydrolyzable group, specifically of 1 to 6 carbon atoms, typical examples of which are organoxy groups including methoxy, ethoxy, propoxy, butoxy, phenoxy, isopropenoxy. Inter alia, $C_1$-$C_4$ alkoxy groups are preferred for reaction rate, easy operation, and easy distillation of by-products, with methoxy and ethoxy being most preferred.

The subscript g is a number in the range: $1 \le g < 2$, preferably $1 \le g < 1.5$. If $g < 1$, the siloxane may cure to so high a crosslinking density that the coating may be susceptible to cracking. If $g \ge 2$, a sufficient hardness may not develop. The subscript h is a number in the range: $0.1 \le h \le 3$, preferably $0.5 \le h \le 2$. If $h < 0.1$, cure and adhesion may be insufficient. If $h > 3$, the siloxane may cure to so high a crosslinking density that the coating may be susceptible to cracking. The subscript i is a number in the range: $0 \le i < 0.5$, preferably $0 \le i < 0.2$. If $i \ge 0.5$, storage stability may worsen so that the coating composition may gel with the lapse of time or become difficult to apply on account of a viscosity buildup.

The reactive siloxane compound (E) may be obtained from partial (co)hydrolytic condensation of a dialkoxysilane, trialkoxysilane, tetraalkoxysilane or a condensate thereof or a mixture thereof.

From the aspects of curability, surface hardness, crack resistance and adhesion-to-substrate of a refinish coating system, it is preferred that a trialkoxysilane and/or partial (co)hydrolytic condensate thereof account for at least 30 mol %, more preferably 40 to 100 mol % of component (E). Also preferably, a tetraalkoxysilane and/or partial (co)hydrolytic condensate thereof accounts for 0 to 40 mol % of component (E), and a dialkoxysilane and/or partial (co)hydrolytic condensate thereof accounts for 0 to 60 mol % of component (E). When the tetraalkoxysilane and/or partial (co)hydrolytic condensate thereof is blended as component (E) in addition to the trialkoxysilane and/or partial (co)hydrolytic condensate thereof, the surface hardness of a cured coating may become higher, but the coating becomes susceptible to cracking if the blending amount is too much. When the dialkoxysilane and/or partial (co)hydrolytic condensate thereof is blended in combination, a cured coating may be endowed with toughness and flexibility, with a risk that if the blending amount is too much, curability and crosslinking density become insufficient, resulting in a lower surface hardness.

Examples of the silane compound are alkylalkoxysilanes and arylalkoxysilanes including tetramethoxysilane, tetraethoxysilane, tetraisopropoxysilane, methyltrimethoxysilane, methyltriethoxysilane, methyltriisopropoxysilane, dimethyldimethoxysilane, diethyldiethoxysilane, ethyltrimethoxysilane, ethyltriethoxysilane, ethyltriisopropoxysilane, propyltrimethoxysilane, propyltriethoxysilane, propyltriisopropoxysilane, butyltrimethoxysilane, butyltriethoxysilane, hexyltrimethoxysilane, hexyltriethoxysilane, octyltrimethoxysilane, octyltriethoxysilane, decyltrimethoxysilane, decyltriethoxysilane, cyclohexyltrimethoxysilane, cyclohexyltriethoxysilane, phenyltrimethoxysilane, phenyltriethoxysilane, phenyltriisopropoxysilane, phenyltriacetoxysilane, tolyltrimethoxysilane, and tolyltriethoxysilane. Also included are condensates of the foregoing, such as dimers and trimers. Of these silane compounds, those silane compounds having a substituent group selected from alkyl groups and a hydrolyzable group selected from methoxy and ethoxy are preferred in view of versatility and cost as well as curability, coating properties, function-imparting effect and storage stability of a silicone-based coating composition. Where a partial (co)hydrolytic condensate is desired, it may be obtained by reacting a silane compound with a necessary amount of water in the presence of an acid catalyst (e.g., acetic acid or hydrochloric acid) for thereby liberating the alcohol. A partial cohydrolytic condensate starting from two or more silane compounds may also be used.

On (co)hydrolysis, a hydrolytic catalyst may be used. The hydrolytic catalyst used herein may be selected from prior art well-known catalysts, for example, acidic hydrogen halides, carboxylic acids, and sulfonic acids, acidic or weakly acidic oxides and inorganic salts, and solid acids such as ion exchange resins. Other examples include organic acids such as acetic acid and maleic acid, and cation exchange resins having sulfonic or carboxylic acid groups on surface. The hydrolytic catalyst may be used in an amount of 0.001 to 10 moles per mole of the hydrolyzable group. Hydrolysis is preferably conducted under weakly acidic conditions, specifically in a range of pH 2 to 7. Unless hydrolysis is conducted under weakly acidic conditions, silanol groups being formed become unstable, allowing condensation reaction to proceed further to an extra molecular weight buildup.

The amount of water added for hydrolysis is 0.05 to 0.8 mole, preferably 0.1 to 0.5 mole per mole of the hydrolyzable group. Less than 0.05 mole of water may be insufficient for polymerization to progress. More than 0.8 mole of water may form more Si—OH groups, with a risk of gelation due to intermolecular crosslinking.

As component (E), a partial (co)hydrolytic condensate of the foregoing silane compound may be used, preferably an oligomer of 2 to 11 monomer units (specifically dimer, trimer or oligomer). A monomer takes a time to cure and has so low a viscosity that the coating composition may flow away and fail to form a satisfactory coating. A polymer of more than 11 monomer units has a high viscosity, detracting from applicability and adhesion.

The siloxane compound as component (E) should preferably have a viscosity at 25° C. of 0.05 to 20 mm²/s, more preferably 0.5 to 10 mm²/s, as measured by an Ostwald viscometer. A viscosity of less than 0.05 mm²/s indicates that the coating composition may flow away prior to curing and fail to form a satisfactory coating. A viscosity in excess of 20 mm²/s may detract from applicability and adhesion.

When an oligomer of 2 to 11 (co)hydrolyzate units of methyltrimethoxysilane and/or methyltriethoxysilane is essentially used as the reactive siloxane compound or component (E), the topcoat coating composition (II) becomes a silicone-based coating composition having a good room-temperature curing behavior and a good balance of properties of a cured coating including transparency, surface hardness, abrasion resistance, adhesion, weather resistance, rust-prevention, and chemical resistance. It is then quite useful as a surface protective coating composition for various articles.

Component (E) is used in an amount of 20 to 70 parts by weight per 100 parts by weight of the sum of components (C) to (G). Less than 20 parts of component (E) may lead to a low strength and hence, a lack of utility. With more than 70 parts of component (E), no further improvement in hardness is expectable, and the adhesion and UV shielding properties of a cured coating may be degraded on account of reduced contents of other components in the composition.

Component (F) is colloidal silica, i.e., a dispersion of silica microparticles in a liquid, which serves to make a cured coating of the inventive composition harder to improve its mar resistance. As long as the objects of the invention are not impaired, the colloidal silica may or may not be surface modified with hydrolyzable silicon groups or silanol groups. The unmodified colloidal silica is available in acidic or basic dispersion form.

Although the dispersing medium of component (F) is not particularly limited, preference is given, from the drying aspect, to a liquid having a relatively low boiling point, specifically of 30 to 200° C., especially 40 to 120° C. under atmospheric pressure, that is, a solvent used in conventional coating compositions. Examples of the dispersing medium include water; alcohols such as methanol, ethanol, isopropanol, n-butanol, 2-methylpropanol, 4-hydroxy-4-methyl-2-pentanone, ethylene glycol, propylene glycol monomethyl ether (PGM), and polyethylene glycol monomethyl ether (PGMD); cellosolves such as methyl cellosolve, ethyl cellosolve, and butyl cellosolve; dimethylacetamide, toluene, xylene, methyl acetate, ethyl acetate, butyl acetate, and acetone. Of these, alcohols and propylene glycol monomethyl ether acetate (PMA) are preferred as the dispersing medium.

The colloidal silica should preferably have an average particle size of up to 200 nm in view of dispersibility, more preferably 1 to 100 nm, and most preferably 1 to 50 nm. The content or concentration of silica in the dispersion is preferably 10 to 70% by weight for ease of handling, though not critical.

In the topcoat coating composition (II), component (F) is used in an amount of 1 to 50 parts by weight, preferably 3 to 30 parts by weight, calculated as nonvolatile, per 100 parts by weight of the sum of components (C) to (G). Less than 1 part of component (F) may lead to a lowering of film strength whereas more than 50 parts may lead to a lack of storage stability.

Component (G) is phosphoric acid, which functions to cure the topcoat coating composition (II). It is selected from orthophosphoric acid and polyphosphoric acid, with orthophosphoric acid being especially preferred for availability and curability as the curing agent. Component (G) may contain water as long as the objects of the invention are not impaired. As hydrous phosphoric acid, a product of purity 85% is commercially marketed and readily available.

Component (G) is used in an amount of 0.5 to 20 parts by weight, preferably 1 to 10 parts by weight per 100 parts by weight of the sum of components (C) to (G). Less than 0.5 part of component (G) may achieve very slow cure at room temperature whereas more than 20 parts may adversely affect the water resistance of a coating.

Besides the foregoing components, a solvent may be added as optional component (H) to the topcoat coating composition (II) for facilitating coating operation. An organic solvent, especially alcohol may be added as the diluent, with an alcohol-containing organic solvent being preferred. Component (H) may be an alcohol alone or a mixture of an alcohol with another organic solvent. In this case, more than one alcohol and/or more than one solvent may be used.

Examples of the alcohol as component (H) include methanol, ethanol, isopropyl alcohol, butanol, isobutyl alcohol, ethylene glycol, diethylene glycol, triethylene glycol, ethylene glycol monomethyl ether, diethylene glycol monomethyl ether, triethylene glycol monomethyl ether, propylene glycol monomethyl ether (PGM), and polyethylene glycol monomethyl ether (PGMD). Examples of the organic solvent other than the alcohol include ketones such as acetone, methyl ethyl ketone and methyl isobutyl ketone, and esters such as ethyl acetate, butyl acetate and isobutyl acetate.

The topcoat coating composition (II) may be prepared by mixing components (C) to (G) and optionally component (H). Preferably it is prepared by combining the components and agitating them at 15 to 40° C. for 0.1 to 5 hours. The amount of the solvent (H) added is preferably such that the composition may have a solid concentration of 30 to 90% by weight, more preferably 50 to 80% by weight. Outside the range, a coating obtained by applying and curing the composition may become defective. Specifically, outside the range, a coating tends to run, wrinkle, mottle, whiten or crack, failing to obtain the desired uniform film.

Resin Glazing

The resin glazing is a plastic substrate having a primer layer and a hard coat layer stacked thereon. The resin glazing is illustrated in the schematic cross-sectional view of FIG. 1 as comprising a plastic substrate (or molded plastic part) 1, a primer layer 2 and a silicone hard coat layer 3.

The molded plastic part may be made of various plastic materials, for example, polycarbonate, polystyrene, acrylic resins (e.g., polymethyl methacrylate), ABS resins, and vinyl chloride resins. For the automotive resin glazing, transparent resin substrates of polycarbonate, polymethyl methacrylate and polystyrene are useful. In particular, polycarbonate resins are advantageously used as automotive windows and sunroofs because of their transparency and impact resistance.

Figure 2:
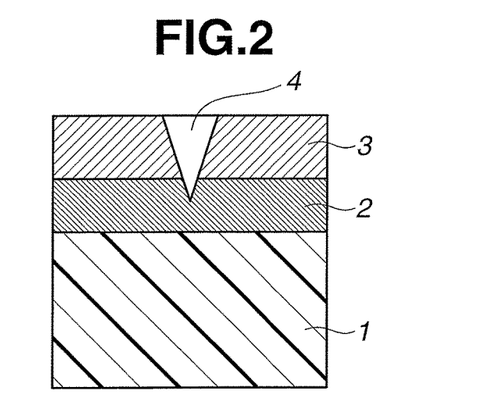
FIG. 2 is a cross-sectional view of the resin glazing where a crack forms.
Figure 3:
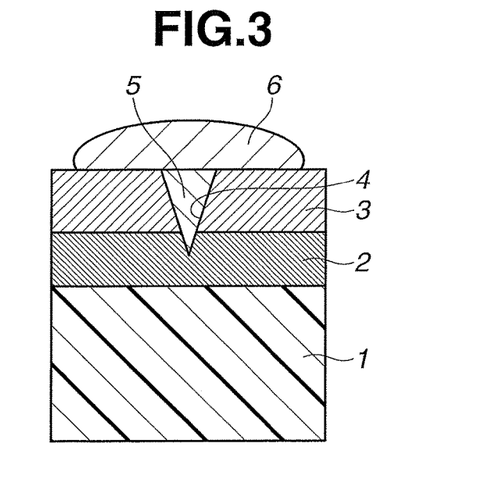
FIG. 3 illustrates in cross-sectional view how to repair the crack in the resin glazing with the refinish coating system of the invention.

Since the primer layer 2 and hard coat layer 3 covering the plastic substrate receive repetitive stresses from expansion and shrinkage under the influence of changes with time caused by humidity, temperature and light, a crack 4 will form in these layers as shown in FIG. 2. Then a multilayer construction as shown in FIG. 3 is formed to fill and cover the crack 4, by applying the refinish coating system of the invention to form an intermediate coating layer 5 and a topcoat coating layer 6.

The hard coat layer is not particularly limited as long as it is formed of a commonly used hard coat coating composition. Preferably the hard coat layer is a silicon oxide-containing film which is formed by curing a coating composition comprising a silicon-containing polymer, typically polysiloxane. Specifically, the hard coat layer is formed of a polysiloxane obtained from hydrolysis and condensation of at least one hydrolyzable silicon compound having the formula (i):

$$R'_p SiX'_{(4-p)} \quad (i)$$

wherein R' is a monovalent organic group of 1 to 18 carbon atoms, X' is a hydrolyzable group such as alkoxy, and p is an integer of 0 to 2 (excluding solely p=0 and p=2) with water (at least 1 mole of water per mole of hydrolyzable group X'), or a mixture of the polysiloxane with microparticulate metal oxide such as silica sol or titanium oxide, or a polysilazane obtained from reaction of at least one hydrolyzable halogenosilicon compound having the formula (ii):

$$R''_q SiX''_{(4-q)} \quad (ii)$$

wherein R" is as defined for R', q is as defined for p, and X" is a hydrolyzable group, typically halogen (excluding solely q=0 and q=2) with ammonia, or a mixture of the polysilazane with microparticulate metal oxide such as silica sol or titanium oxide.

Preferably the hard coat layer further contains a flexibilizer. The flexibilizer renders the hard coat layer so flexible that the hard coat layer may have an increased threshold elongation. This minimizes fissure or peeling of a coating caused by internal strains of repetitive expansion/shrinkage due to a difference in linear shrinkage factor between the hard coat layer and the primer layer or resin substrate. The resulting coated member has improved crack resistance, adhesion and weather resistance.

In formulae (i) and (ii), examples of the $C_1$-$C_{18}$ organic group represented by R' and R" include alkyl groups such as methyl, ethyl, propyl and butyl, aryl groups such as phenyl, and aralkyl groups such as benzyl. For the intended application where mar resistance is required, alkyl groups are preferred, with methyl being most preferred. Examples of the hydrolyzable group represented by X' and X" include organoxy groups of 1 to 6 carbon atoms, typically alkoxy, and halogen atoms such as chlorine. X' is preferably an organoxy group, especially alkoxy, and X" is preferably a halogen atom, especially chlorine.

The flexibilizer used herein may be selected from various commonly used ones. Suitable flexibilizers include polysiloxane resins obtained from hydrolytic condensation of at least one hydrolyzable silicon compound having the formula:

$$R'''_r SiX'''_{(4-r)}$$

wherein R''' is an organic group of 1 to 18 carbon atoms as defined for R' and R", X''' is a hydrolyzable group as defined for X' and X", and r is an integer of 0 to 2 (excluding solely r=0 and r=2), acrylic resins, polyester resins, and polyurethane resins; silicone rubber in solution or microparticulate form obtained from partial or entire crosslinking of diorganosilicone terminated with a hydrolyzable silyl group or polymerizable group-containing organic group; polyurethane rubber, acrylonitrile rubber or other rubber in solution or microparticulate form. Inter alia, polysiloxane resins are preferred.

The flexibilizer is preferably added in an amount of 3 to 60% by weight based on the hard coat layer (=100% by weight). The flexibilizer within the range is effective for minimizing fissure or peeling of the coating while maintaining mar resistance. Then a coated member having improved mar resistance as well as adhesion and crack resistance is obtained. The amount of the flexibilizer is more preferably 5 to 60% by weight, and most preferably 10 to 60% by weight.

Also, the hard coat layer may further contain a UV absorber. The hard coat layer containing a UV absorber prevents photo-degradation of the resinous substrate, and as a result, the weathering adhesion between resinous substrate and primer layer is improved. Examples of the UV absorber used herein include organic UV absorbers having benzophenone or benzotriazole groups, and microparticulate inorganic oxides such as titania ($TiO_2$), ceria ($CeO_2$), and zinc oxide (ZnO). Those UV absorbers of least sublimation and least extinction with time under the action of light and water are preferred. Then a coated member which minimizes UV-degradation of the resinous substrate at its surface, maintains over a long term the adhesion between the resinous substrate and the coating (primer layer), and has improved weathering adhesion is obtained. When the hard coat layer is formed using an organopolysiloxane composition having microparticulate silica or colloidal silica further added thereto, a coated member having higher mar resistance is obtained.

The thickness of the hard coat layer is preferably 1 to 30 μm although the thickness depends on the type of hard coat layer and the type of UV absorber. The hard coat layer having a thickness within the range is minimized in fissure or peeling and has improved mar resistance. More preferably the thickness of the hard coat layer is 3 to 15 μm.

Figure 1:
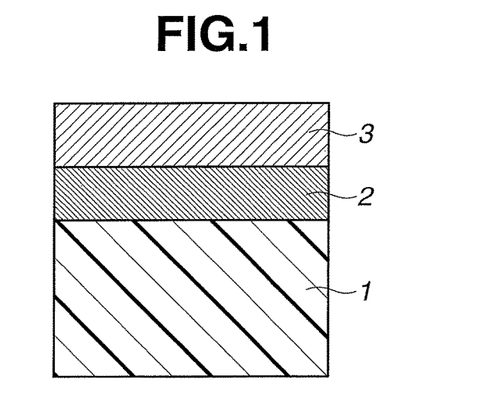
FIG. 1 is a cross-sectional view of an exemplary resin glazing.

The coated member includes the primer layer 2. The primer layer is effective for enhancing the adhesion of the plastic substrate and the hard coat layer. The primer of the primer layer 2 is not particularly limited as long as it is a common resin primer. Suitable primer resins include epoxy resins, urethane resins, polyester resins, melamine resins, phenolic resins, polyamides, ketone resins, vinyl resins, thermosetting acrylic resins, humidity-curable acrylic resins, thermoplastic acrylic resins, and modified acrylic resins such as silane or siloxane-modified acrylic resins. These resins may be used alone or in admixture of two or more. Inter alia, an acrylic primer based on an acrylic resin is preferred.

Specifically, suitable acrylic resins include heat and/or humidity-curable (meth)acrylic resins which are copolymers comprising a reactive group-containing (meth)acrylic acid derivative, and thermoplastic (meth)acrylic resins comprising a non-reactive (meth)acrylate.

Examples of the reactive group-containing (meth)acrylic acid derivative include alkoxysilyl-containing (meth)acrylic acid derivatives such as
3-(meth)acryloxypropyltrimethoxysilane,
3-(meth)acryloxypropyltriethoxysilane,
3-(meth)acryloxypropylmethyldimethoxysilane,
1-[3-(meth)acryloxypropyl]pentamethoxydisilane,
1-[3-(meth)acryloxypropyl]-1-methyl-tetramethoxydisilane,
a cohydrolytic condensate of 3-(meth)acryloxypropylsilane and tetramethoxysilane, and
a cohydrolytic condensate of 3-(meth)acryloxypropylsilane and methyltrimethoxysilane;
mono(meth)acrylates of polyhydric alcohols such as 2-hydroxyethyl (meth)acrylate, 3-hydroxypropyl (meth)acrylate, 2-hydroxybutyl (meth)acrylate, glycerol mono(meth)acrylate, pentaerythritol mono(meth)acrylate, polyethylene glycol mono(meth)acrylate (typically containing 2 to 20 ethylene glycol units), and polypropylene glycol mono(meth)acrylate (typically containing 2 to 20 propylene glycol units);
(meth)acrylic acids such as acrylic acid and methacrylic acid; amino-containing (meth)acrylates such as 2-aminoethyl (meth)acrylate and 2-(N-methylamino)ethyl (meth) acrylate; and epoxy-containing (meth)acrylates such as glycidyl (meth)acrylate.

Examples of the non-reactive (meth)acrylate include (meth)acrylates of monohydric alcohols such as methyl (meth)acrylate, ethyl (meth)acrylate, n-propyl (meth)acrylate, isopropyl (meth)acrylate, n-butyl (meth)acrylate, isobutyl (meth)acrylate, t-butyl (meth)acrylate, n-hexyl (meth)acrylate, 2-ethylhexyl (meth)acrylate, n-octyl (meth) acrylate, n-decyl (meth)acrylate, lauryl (meth)acrylate, stearyl (meth)acrylate, cyclohexyl (meth)acrylate, 4-methylcyclohexyl (meth)acrylate, 4-t-butylcyclohexyl (meth) acrylate, isobornyl (meth)acrylate, dicyclopentanyl (meth) acrylate, dicyclopentenyloxyethyl (meth)acrylate, and benzyl (meth)acrylate;

(meth)acrylic acid monomers having a cyclic hindered amine structure; and (meth)acrylic acid derivatives containing a UV-absorbing group such as 2-(2'-hydroxy-5'-(meth)acryloxyphenyl)-2H-benzotriazole, 2-[2'-hydroxy-5'-(2-(meth)acryloxyethyl)phenyl]-2H-benzotriazole, 2-[2'-hydroxy-3'-methyl-5'-(8-(meth) acryloxyoctyl)phenyl]-2H-benzotriazole, 2-hydroxy-4-(2-(meth)acryloxyethoxy) benzophenone, 2-hydroxy-4-(4-(meth)acryloxybutoxy) benzophenone, 2,2'-dihydroxy-4-(2-(meth) acryloxyethoxy)benzophenone, 2,4-dihydroxy-4'-(2-(meth)acryloxyethoxy)benzophenone, 2,2',4-trihydroxy-4'-(2-(meth)acryloxyethoxy)benzophenone, 2-hydroxy-4-(3-(meth)acryloxy-2-hydroxypropoxy)benzophenone, and 2-hydroxy-4-(3-(meth)acryloxy-1-hydroxypropoxy)-benzophenone.

Also, the acrylic primer may comprise a thermosetting acrylic resin and a thermoplastic acrylic resin, preferably in a weight ratio of 95:5 to 30:70. On use of a thermoplastic acrylic resin in this weight ratio range, the primer layer may have a reduced coefficient of linear expansion while maintaining the primer effect. As a result, the stress associated with expansion and shrinkage of the primer layer caused by temperature changes with time is reduced, and so, the crack in the coating is reduced. More preferably, the thermosetting acrylic resin and the thermoplastic acrylic resin are in a weight ratio of 90:10 to 35:65, even more preferably 80:20 to 40:60.

Also, the primer layer may further contain a UV absorber. The primer layer containing a UV absorber prevents photo-degradation of the resinous substrate, for thereby improving the weathering adhesion between resinous substrate and primer layer. Suitable UV absorber used herein include inorganic and organic UV absorbers commonly used in the art, and preferably bound UV absorbers anchored to the primer resin via chemical bonds. The bound UV absorber is minimized in sublimation and effective for preventing the UV absorber from extinction with time under the action of light and water. As a result, it helps to reduce UV-degradation on the surface of a resinous substrate, and to maintain the adhesion between resinous substrate and primer layer. On use of a primer layer formed of a primer composition comprising an alkoxy-containing organic copolymer of a UV-absorbing vinyl monomer, an alkoxysilyl-containing vinyl monomer, and another monomer copolymerizable therewith as described in JP-A 2001-214122, a coated member having more adhesion and weather resistance is obtained.

The amount of the UV absorber anchored in the primer layer is preferably 3 to 25% by weight based on the primer layer (=100% by weight). Outside the range, a primer layer with a less amount of the UV absorber may be insufficient in UV absorption, low in weathering adhesion, and susceptible to crack and peel; and a primer layer with an excessive amount of the UV absorber may be low in adhesion to the hard coat layer and less adherent even at the initial. More preferably the amount of UV absorber is 5 to 20% by weight.

Although the thickness of the primer layer depends on the type of primer resin and the type of UV absorber, the thickness is preferably at least 3 μm when the primer layer contains a UV absorber. The primer layer having a thickness of at least 3 μm allows the amount of UV absorber to be increased to a higher level and becomes more effective for minimizing the photo-degradation of the resinous substrate. As a result, the weathering adhesion between resinous substrate and primer layer is further improved. More preferably the thickness of the primer layer is 5 to 15 μm. As long as the primer layer has a thickness within this range, it is effective for bonding the resinous substrate and the hard coat layer tightly and providing the coated member with satisfactory weather resistance.

Repair Method

Another embodiment of the invention is a method for repairing a damage area of a silicone hard coat layer on an automotive resin glazing substrate, using the refinish coating system defined herein. The method comprises the steps of applying the intermediate coating composition to the damage area for burying irregularities of the damage, removing any extra of the intermediate coating composition such as by wiping, so as to be flush with the hard coat layer, applying the topcoat coating composition onto the intermediate coating, and curing both the coating compositions. The means of applying the composition to the substrate may be any of standard coating techniques, for example, brush coating, spray coating, dipping, flow coating, roll coating, curtain coating, spin coating, and knife coating.

The method for forming a refinish coating is by applying the intermediate coating composition to the substrate to form an intermediate coating, removing any extra of the intermediate coating composition such as by wiping (while leaving only the portion on the damage or crack), applying the topcoat coating composition onto the intermediate coating, and drying and curing at room temperature or heat curing the coating composition to form a topcoat coating.

The curing steps after application of the intermediate coating composition and after application of the topcoat coating composition may be air drying (allowing to stand in air) or heating at an elevated temperature. The curing temperature and time are not particularly limited. In the case of heat curing, the coating is preferably heated to a temperature below the heat resistant temperature of the substrate for 10 minutes to 2 hours. In the non-heating case, the coating is allowed to stand at 10 to 35° C. for 2 hours to 2 days. The most preferred set of curing conditions is 1 hour at 105° C. or 1 day at 25° C.

Although the thickness of the intermediate coating and topcoat coating is not particularly limited, each preferably has a thickness of 0.1 to 100 μm, more preferably 0.5 to 60 μm. The thickness of each layer is most preferably 1 to 30 μm to ensure that the coating has an appropriate hardness, mar resistance, and long-term stable adhesion and is crack-free. For each layer, multiple coating is possible by repeating the foregoing steps. A coating with a thickness of less than 0.1 μm may be insufficient in hardness and abrasion resistance. A coating with a thickness of more than 100 μm may contain bubbles which adversely affect the adhesion to the topcoat layer or allow cracks to form.

EXAMPLE

Synthesis Examples, Examples, and Comparative Examples are given below by way of illustration and not by way of limitation.

Ingredients

As silica, dry surface treated silica MU-215 (hydrophobic, BET surface area 120 m$^2$/g) is available from Shin-Etsu; fumed silica Aerosil 300 (hydrophilic, BET surface area 300 m$^2$/g) is available from Nippon Aerosil Co., Ltd. Dimethyldimethoxysilane KBM-22, methyltrimethoxysilane KBM-13, dimethylpolysiloxane KF96-30 cs, and dimethyltetramethoxydisiloxane are available from Shin-Etsu. As microparticulate silica dispersion, methanol silica sol (colloidal silica dispersed in methanol, nonvolatile 30 wt %) is available from Nissan Chemical Industries, Ltd. As phosphoric acid, orthophosphoric acid (purity 85%) is available from Wako Pure Chemical Industries, Ltd. Notably, Shin-Etsu Chemical Co., Ltd. is simply abbreviated as Shin-Etsu.

Synthesis of Reactive Siloxane (A)

Synthesis Example 1

A flask (volume 300 ml) equipped with a stirrer, condenser, thermometer and dropping funnel was charged with 141 g of dimethyltetramethoxydisiloxane (dimer of methyltrimethoxysilane, 0.625 mol, siloxane weight 83.7 g) and 20 g of methanol. With stirring at an internal temperature of 20-30° C., 0.84 g (1% based on the siloxane weight) of Purolite C106 (carboxylic acid type cation exchange resin by Organo) was added, after which 11.8 g (0.66 mol) of deionized water was added dropwise over 30 minutes so as to keep the temperature below 50° C. Thereafter, the flask was heated at 67° C., at which the reaction solution was aged for 2 hours under methanol reflux. Thereafter, the flask was further heated up, at which 61.2 g (1.9 mol) of methanol was distilled off under atmospheric pressure. The reaction solution was aged for 1 hour at a bath temperature of 150° C., allowing hydrolysis and polycondensation reaction to take place. By heating at an internal temperature of 80° C. under a vacuum of 20 mmHg, the residual alcohol and low-boiling fraction were distilled off. Filtration gave a colorless transparent liquid, which was a reactive siloxane (A-1) (amount 100 g, yield 90%). Table 1 tabulates physical properties of siloxane (A-1). In Table 1, the nonvolatile content was determined by metering a sample in an aluminum dish, heating in an air atmosphere oven at 105° C. for 3 hours, measuring the sample weight, and computing a change of weight before and after heating. The viscosity was measured at 25° C. by an Ostwald viscometer. The weight average molecular weight (Mw) was measured in a 0.5% toluene solution of siloxane by gel permeation chromatography (GPC) versus polystyrene standards. The average degree of polymerization (DOP) was determined by GPC and NMR spectroscopy. The silanol content was measured by the Grignard method. These measurements apply to Synthesis Examples 2 and 3.

Synthesis Example 2

A flask (volume 500 ml) equipped with a stirrer, condenser, thermometer and dropping funnel was charged with 161 g (0.71 mol) of dimethyldimethoxysilane, 176.5 g (1.47 mol) of dimethyltetramethoxydisiloxane, and 28.5 g of methanol. With stirring at an internal temperature of 20-30° C., 2.4 g (0.6% based on the siloxane weight) of Purolite CT-169DR (sulfonic acid type cation exchange resin by Organo) was added, after which 41.6 g (2.3 mol) of deionized water was added dropwise over 30 minutes so as to keep the temperature below 50° C. Thereafter, the flask was heated at 67° C., at which the reaction solution was aged for 2 hours under methanol reflux. Thereafter, the flask was further heated up, at which 185 g (5.8 mol) of methanol was distilled off under atmospheric pressure. The reaction solution was aged for 1 hour at a bath temperature of 150° C., allowing hydrolysis and polycondensation reaction to take place. By heating at an internal temperature of 80° C. under a vacuum of 20 mmHg, the residual alcohol and low-boiling fraction were distilled off. Filtration gave a colorless transparent liquid, which was a reactive siloxane (A-2) (amount 210 g, yield 91%). Physical properties of siloxane (A-2) are shown in Table 1.

Synthesis Example 3

A flask (volume 300 ml) equipped with a stirrer, condenser, thermometer and dropping funnel was charged with 156.7 g (0.6 mol, siloxane weight 92.8 g) of dimethyltetramethoxydisiloxane and 28 g of methanol. With stirring at an internal temperature of 20-30° C., 0.56 g (0.6% based on the siloxane weight) of Purolite CT-169DR (sulfonic acid type cation exchange resin by Organo) was added, after which 15 g (0.83 mol) of deionized water was added dropwise over 30 minutes so as to keep the temperature below 50° C. Thereafter, the flask was heated at 67° C., at which the reaction solution was aged for 2 hours under methanol reflux. Thereafter, the flask was further heated up, at which 70 g (2.2 mol) of methanol was distilled off under atmospheric pressure. The reaction solution was aged for 1 hour at a bath temperature of 150° C., allowing hydrolysis and polycondensation reaction to take place. By heating at an internal temperature of 80° C. under a vacuum of 20 mmHg, the residual alcohol and low-boiling fraction were distilled off. Filtration gave a colorless transparent liquid, which was a reactive siloxane (A-3) (amount 106.6 g, yield 90%). Physical properties of siloxane (A-3) are shown in Table 1.

Synthesis of UV-Absorbing Silane (C)

Synthesis Example 4

In 70 ml of toluene was dissolved 25.4 g (0.1 mol) of 4-allyloxy-2-hydroxybenzophenone. To the solution, 63.5 mg of platinum catalyst PL50-T (Shin-Etsu) was added, and after a temperature rise to 65° C., 29.3 g (0.24 mol) of trimethoxysilane was added. The solution was kept at a temperature of 65-85° C. for about 1-2 hours. Thereafter, the reaction solution was cooled to room temperature, 5 g of silica gel Wakogel® C-100 was added whereby the platinum catalyst was removed via adsorption and filtration. Thereafter, the toluene was stripped off in vacuum, obtaining 34.8 g (0.092 mol, yield 92%) of a red oily product, silane. The NMR spectrum of the main product was coincident with the structure of 2-hydroxy-4-trimethoxysilylpropoxybenzophenone. This UV-absorbing silane is designated (C-1).

Synthesis of Partial Hydrolytic Condensate of Multifunctional Alkoxysilane (E)

Synthesis Example 5

A flask (volume 500 ml) equipped with a stirrer, condenser, thermometer and dropping funnel was charged with 115.8 g (0.85 mol) of methyltrimethoxysilane (KBM-13, Shin-Etsu). With stirring at 25° C., 18.8 g (1.04 mol) of 0.05N hydrochloric acid was added dropwise, whereupon hydrolysis reaction took place for 2 hours under reflux of by-produced methanol. The flask was heated at 120° C. to distill off the methanol. The residue was cooled to room temperature and filtered, obtaining 85 g of partial hydrolytic condensate of multifunctional alkoxysilane (average DOP 5, viscosity 5 mm$^2$/s). This partial hydrolytic condensate is designated (E-1).

Preparation of Intermediate Coating Composition (I)

Preparation Example 1

A polyethylene cup container (volume 200 ml) was charged with 100 g of reactive siloxane (A-1) in Synthesis Example 1. With stirring by a spatula, 15 g of silica MU-215 was added. Milling was continued until the mixture became a fully uniform paste. In this way, an intermediate coating composition was prepared. Table 2 tabulates physical properties of the composition. In Table 2, the viscosity was measured at 25° C. by a rotational viscometer (BM type, 6 rpm). The nonvolatile content was determined by metering a sample in an aluminum dish, heating in an air atmosphere oven at 105° C. for 3 hours, measuring the sample weight, and computing a change of weight before and after heating. These measurements apply to Preparation Examples 2 to 6.

Preparation Example 2

A polyethylene cup container (volume 200 ml) was charged with 100 g of reactive siloxane (A-2) in Synthesis Example 2. With stirring by a spatula, 15 g of silica (MU-215) was added. Milling was continued until the mixture became a fully uniform paste. The resulting intermediate coating composition had physical properties as shown in Table 2.

Preparation Example 3

A polyethylene cup container (volume 200 ml) was charged with 100 g of reactive siloxane (A-3) in Synthesis Example 3. With stirring by a spatula, 15 g of silica (MU-215) was added. Milling was continued until the mixture became a fully uniform paste. The resulting intermediate coating composition had physical properties as shown in Table 2.

Preparation Example 4

A polyethylene cup container (volume 200 ml) was charged with 100 g of reactive siloxane (A-2) in Synthesis Example 2. With stirring by a spatula, 4 g of silica Aerosil 300 was added. Milling was continued until the mixture became a fully uniform paste. The resulting intermediate coating composition had physical properties as shown in Table 2.

Preparation Example 5

A polyethylene cup container (volume 200 ml) was charged with 100 g of silicone oil KF96-30 cs. With stirring by a spatula, 15 g of silica MU-215 was added. Milling was continued until the mixture became a fully uniform paste. The resulting intermediate coating composition had physical properties as shown in Table 2.

Preparation Example 6

A polyethylene cup container (volume 200 ml) was charged with 100 g of reactive siloxane (A-1) in Synthesis Example 1. This was an intermediate coating composition which had physical properties as shown in Table 2.

Preparation of Topcoat Coating Composition (II)

Preparation Example 7

A flask (volume 300 ml) equipped with a stirrer, condenser, thermometer and dropping funnel was charged with 33.75 g of dimethyldimethoxysilane (KBM-22, Shin-Etsu). With stirring below 25° C., 4 g of 86% orthophosphoric acid was added dropwise. Stirring was continued for 30 minutes, followed by addition of 12.5 g of methanol silica sol (Nissan Chemical Industries, Ltd., colloidal silica, SiO$_2$ content 30%), and subsequent addition of 5 g of UV-absorbing silane (C-1) in Synthesis Example 4 and 45 g of partial hydrolytic condensate of multifunctional alkoxysilane (E-1) in Synthesis Example 5. Milling was continued for 1 hour at room temperature. In this way, a topcoat coating composition was prepared.

Physical properties of the liquid composition were evaluated by the following methods, with the results tabulated in Table 3. The kinematic viscosity was measured at 25° C. by an Ostwald viscometer. The nonvolatile content was determined by metering a sample in an aluminum dish, heating in an air oven at 150° C. for 30 minutes, measuring the sample weight, and computing a change of weight before and after heating. The pH was measured at 25° C. by a pH meter.

Preparation Example 8

A topcoat coating composition was prepared by the same procedure as in Preparation Example 7 except that 4 g of Zn catalyst (D-15, Shin-Etsu) was used instead of 4 g of 86% orthophosphoric acid.

Preparation Example 9

A topcoat coating composition was prepared by the same procedure as in Preparation Example 7 except that 4 g of Ti catalyst (D-25, Shin-Etsu) was used instead of 4 g of 86% orthophosphoric acid. The coating composition gelled.

Preparation Example 10

A topcoat coating composition was prepared by the same procedure as in Preparation Example 7 except that 4 g of Al catalyst (CAT-AC, Shin-Etsu) was used instead of 4 g of 86% orthophosphoric acid. The coating composition gelled.

TABLE 1

| Siloxane | Synthesis Example 1 (A-1) | Synthesis Example 2 (A-2) | Synthesis Example 3 (A-3) | KF96-30cs |
|---|---|---|---|---|
| Structure (mol %) | T units 100% | D units/T units = 50%/50% | T units 100% | D units ~100% |
| Kinematic viscosity (mm$^2$/s) | 32 | 96 | 109 | 29 |

TABLE 1-continued

| Siloxane | Synthesis Example 1 (A-1) | Synthesis Example 2 (A-2) | Synthesis Example 3 (A-3) | KF96-30cs |
|---|---|---|---|---|
| Nonvolatile content (wt %) @105° C./3 h | 77% | 88% | 88% | 0% |
| Mw | 1500 | 4500 | 3000 | 4100 |
| Average DOP | 10 | 50 | 15 | — |
| Silanol content (wt %) | 1.10% | 0.15% | 0.15% | 0% |

TABLE 2

| Intermediate coating composition | | Preparation Example | | | | | |
|---|---|---|---|---|---|---|---|
| | | 1 | 2 | 3 | 4 | 5 | 6 |
| Formulation | (A) reactive siloxane | Synthesis Example 1 (A-1) | Synthesis Example 2 (A-2) | Synthesis Example 3 (A-3) | Synthesis Example 2 (A-2) | KF96-30cs | Synthesis Example 1 (A-1) |
| | (B) silica | MU-215 | MU-215 | MU-215 | Aerosil 300 | MU-215 | — |
| | (A)/(B) weight ratio | 100/15 | 100/15 | 100/15 | 100/4 | 100/15 | 100/0 |
| Physical properties | Viscosity (mPa · s) | 3500 | 6000 | 100000 | 2000 | 98500 | 32 |
| | Nonvolatile content (wt %) @105° C./3 h | 86% | 92% | 92% | 92% | 100% | 77% |

TABLE 3

| Topcoat coating composition | Preparation Example | | | |
|---|---|---|---|---|
| | 7 | 8 | 9 | 10 |
| Kinematic viscosity (mm²/s) | 2.5 | 2.2 | gelled | gelled |
| Nonvolatile content (wt %) @150° C./0.5 h | 58% | 28% | | |
| Refractive index | 1.3916 | 1.3914 | | |
| pH | 1.1 | 5.1 | | |

Preparation Example 11

Preparation of Primer Composition

A monomer mixture was previously prepared from 72 g of 2-[2'-hydroxy-5'-(2-methacryloxyethyl)phenyl]-2H-benzotriazole (RUVA-93 by Otsuka Chemical Co., Ltd.), 80 g of γ-methacryloxypropyltrimethoxysilane (KBM-503, Shin-Etsu), 270 g of methyl methacrylate (MMA), and 600 g of diacetone alcohol (DAA). An initiator solution was previously prepared by dissolving 3 g of 2,2'-azobis(2-methylbutyronitrile) as polymerization initiator in 200 g of diacetone alcohol.

A 2-L flask equipped with a stirrer, condenser and thermometer was charged with 248 g of diacetone alcohol as solvent, which was heated at 80° C. under a nitrogen stream. A 400 g portion of the monomer mixture and a 150-g portion of the initiator solution were fed to the flask in sequence. Reaction was effected at 80° C. for 30 minutes, after which the remainder of the monomer mixture and the remainder of the initiator solution were simultaneously added dropwise at 80-90° C. over 1.5 hours. Stirring was continued at 80-90° C. for a further 5 hours. The resulting solution of a UV-absorbing vinyl based copolymer having alkoxysilyl groups had a viscosity of 5,370 mPa·s as measured at 25° C. by a rotational viscometer. The copolymer had a UV-absorbing unit content of 18%, an alkoxysilyl group content of 20%, and a Mw of 27,600 as measured versus polystyrene standards by GPC. To 300 g of the solution (120 g of the polymer), were added 430 g of diacetone alcohol (DAA), 50 g of di(propylene glycol) monomethyl ether (MFDG), 30 g of propylene glycol monomethyl ether acetate (PGMAC), and 70 g of triethyl orthoformate. Further, 70 g (20 g as silica solids) of a silica sol/organic solvent dispersion (PMA-ST by Nissan Chemical Industries, Ltd., colloidal silica dispersed in propylene glycol monomethyl ether acetate, solid concentration 30%, primary particle size 10-15 nm) was added to complete a primer composition. The primer composition had a viscosity of 17.3 mm²/s and a nonvolatile content of 14.4% on heating at 150° C. for 30 minutes.

Preparation Example 12

Preparation of Silicone Hard Coat Composition

A 2-L three-neck flask equipped with a stirrer, condenser and thermometer was charged with 408 g of methyltrimethoxysilane and 400 g of toluene, to which 11 g of 98% methanesulfonic acid was added as catalyst. While the internal temperature was kept below 30° C., 146 g of water was added dropwise for hydrolysis of methyltrimethoxysilane. At the end of dropwise addition, stirring was continued at room temperature for a further 2 hours to drive the reaction to completion. Thereafter, an acidic component was neutralized and the formed methanol was distilled off in vacuum. The solution was washed with water twice to completely remove the neutralization salt and then heated in vacuum at 105° C. for 3 hours to evaporate off the solvent component, obtaining 210 g of a siloxane resin as colorless transparent solid. The resin had a Mw of 7,500 as measured by GPC. On analysis by $^{29}$Si—NMR and IR spectroscopy, the siloxane resin was identified to have an average compositional formula: $MeSi(OMe)_{0.06}(OH)_{0.12}(O)_{1.41}$ wherein Me is methyl. The transparent solid resin had a softening point of 73° C. as measured by an automatic ring-and-ball softening point tester according to JIS K2207. The siloxane resin, 283 g, was dissolved in 717 g of isopropanol to form a flexibilizer polysiloxane solution having a solid concentration of 28 wt %.

A 2-L flask equipped with a stirrer, condenser and thermometer was charged with 371 g of methyltrimethoxysilane (KBM-13) and 13 g of UV-absorbing silane (C-1) in Synthesis Example 4. With stirring at 20° C., a mixture of 108 g of colloidal silica dispersed in water (Snowtex O by Nissan Chemical Industries, Ltd., average particle size 15-20 nm, $SiO_2$ content 20%) and 252 g of 0.25N acetic acid aqueous solution was added thereto, followed by high speed stirring.

Stirring was continued at 60° C. for a further 3 hours, and 330 g of cyclohexanone was added. The by-produced methanol and part of water, totaling to 335 g, were distilled off under atmospheric pressure. Thereafter, 205 g of isopropanol, 400 g of the flexibilizer polysiloxane solution, and 0.6 g of polyether-modified silicone KP-341 (Shin-Etsu) as leveling agent were added, and 3.7 g of a 10% tetrabutylammonium hydroxide aqueous solution was added as curing catalyst. The resulting organopolysiloxane solution had a viscosity of 6.98 mm$^2$/s and a Mw of 2,500 as measured by GPC. This is a silicone hard coat composition.

Preparation of Multilayer Structure

The plastic substrate used was a polycarbonate resin sheet of 15 cm×15 cm×0.5 mm thick (Iupilon® by Mitsubishi Engineering-Plastics Corp.). Film formation for a hard coat-covered substrate is as follows. The primer composition was flow coated on one surface of the PC sheet and heated at 120° C. for 1 hour for curing. The cured coating was 10 μm thick. Next, the silicone hard coat composition was flow coated thereon and heated at 120° C. for 1 hour for curing. The cured coating was 10 μm thick.

Evaluation of Coating

For convenience of description, the hard coat-covered PC substrate is simply referred to as "substrate." On the hard coat surface of the substrate, each of the intermediate coating compositions of Preparation Examples 1 to 6 was applied with a spatula. The substrate was kept upright and stationary for 30 minutes, after which its outer appearance was visually observed and reported as the outer appearance of intermediate coating prior to wiping. Thereafter, the substrate was wiped with a wiper (Bemcot® M-3II by Asahi Kasei Fibers Corp.), and its outer appearance was visually observed and reported as the outer appearance of intermediate coating after wiping.

Further, each of the topcoat coating compositions of Preparation Examples 7 to 10 was flow coated and allowed to stand in an atmosphere of 25° C. and RH 65% for one day for curing. The cured coating had a thickness of about 10 μm. This coating was measured for initial haze (Hz), delta haze (ΔHz) after Taber abrasion, initial adhesion, and adhesion after boiling. In the evaluation of outer appearance and flaw-hiding effect, the substrate was rubbed with steel wool (Bonstar® #0000, Nippon Steel Wool Co., Ltd.) to flaw the hard coat surface, the intermediate coating composition was coated thereto with a spatula and wiped with a wiper (Bemcot® M-3II by Asahi Kasei Fibers Corp.), and finally the topcoat coating composition was flow coated and allowed to stand in an atmosphere of 25° C. and RH 65% for one day for curing. The thus coated substrate was visually observed to evaluate its outer appearance and flaw-hiding effect. The physical properties (including outer appearance, hiding effect, adhesion, mar resistance, and overall evaluation) of the film were evaluated according to the following criterion, with the results shown in Table 4.

Flaw-Hiding Effect

The silicone hard coat film on a PC substrate was rubbed with steel wool (Bonstar® #0000, Nippon Steel Wool Co., Ltd.) to form a model flaw in the film, which was repaired by applying the intermediate coating composition and the topcoat coating composition. On visual observation, the flaw-hiding effect was evaluated.

○: flaw was not visible
Δ: flaw was visible at a certain view angle
X: flaw was apparent Coating Hardness Abrasion resistance was evaluated by means of a Taber abrasion tester Abraser 5130 by Toyo Seiki Co., Ltd. After the abrasion test (wheel CS-10F, load 500 g, 500 turns), the cured film was measured for haze (%) by a haze meter NDH 2000 (Nippon Denshoku Industries Co., Ltd.). A difference from the initial haze is reported as delta haze (ΔHz).

○: ΔHz≤10
Δ: 10<ΔHz≤20
X: ΔHz>20

Adhesion

Adhesion was analyzed by a cross-hatch adhesion test according to JIS K5400, specifically by scribing the sample with a razor along 6 longitudinal and 6 transverse lines at a spacing of 2 mm to define 25 square sections, tightly attaching adhesive tape (Cellotape® by Nichiban Co., Ltd.) thereto, rapidly pulling back the adhesive tape at an angle of 90°, and counting the number (X) of coating sections kept unpeeled. The result, expressed as X/25, is reported as initial adhesion. The sample was immersed in boiling water for 2 hours before the adhesion test, with the test results reported as adhesion after boiling.

○: X=25
Δ: 10≤X<25
X: X<10

Overall Evaluation
⊚: all items rated ○
○: one item rated Δ
Δ: two or more items rated Δ, no item rated X
X: one or more items rated X

TABLE 4

|  |  | Example | | | | Comparative Example | | |
| --- | --- | --- | --- | --- | --- | --- | --- | --- |
|  |  | 1 | 2 | 3 | 4 | 1 | 2 | 3 |
| Coating system | Intermediate coating composition (I) | Preparation Example 1 | Preparation Example 2 | Preparation Example 3 | Preparation Example 4 | Preparation Example 5 | Preparation Example 6 | Preparation Example 1 |
|  | Topcoat coating composition (II) | Preparation Example 7 | Preparation Example 7 | Preparation Example 7 | Preparation Example 7 | Preparation Example 7 | Preparation Example 7 | Preparation Example 8 |
| Outer appearance of intermediate coating | Prior to wiping | clear | clear | clear | irregular | clear | liquid run down | clear |
|  | After wiping | retained within flaw | retained within flaw | retained within flaw | retained within flaw | retained within flaw | flow out of flaw | retained within flaw |
| Properties of refinish coating* | Initial adhesion | 25 | 25 | 25 | 25 | 0 | 25 | topcoat coating composition did not cure |
|  | Adhesion after boiling | 25 | 25 | 25 | 25 | 0 | 25 |  |
|  | Initial haze (%) | 0.3 | 0.3 | 0.3 | 0.3 | 0.3 | 0.3 |  |
|  | ΔHz after abrasion | 6.8 | 9.1 | 7.1 | 8.5 | 25 | 7.1 |  |
|  | Flaw-hiding effect | ○ | ○ | ○ | ○ | ○ | X |  |

TABLE 4-continued

| | | Example | | | | Comparative Example | | |
|---|---|---|---|---|---|---|---|---|
| | | 1 | 2 | 3 | 4 | 1 | 2 | 3 |
| Evaluation* | Outer appearance | ○ | ○ | ○ | Δ | ○ | X | X |
| | Adhesion | ○ | ○ | ○ | ○ | X | ○ | X |
| | Mar resistance | ○ | ○ | ○ | ○ | X | ○ | X |
| | Hiding effect | ○ | ○ | ○ | ○ | ○ | X | X |
| Overall evaluation | | ⊚ | ⊚ | ⊚ | ○ | X | X | X |

*Film forming conditions: coating the intermediate coating composition, wiping off any extra, flow coating the topcoat coating composition, and curing at 25° C. and RH 65% for 1 day As seen from the results of Table 4, the coating systems (Examples 1 to 4) within the scope of the invention form cured films which are improved in transparency, adhesion and mar resistance, and have a satisfactory flaw-hiding effect. By contrast, the coating system of Comparative Example 1 forms a cured film which is inferior in mar resistance and adhesion, and the coating system of Comparative Example 2 which is free of silica forms a cured film having an inferior hiding effect. It is demonstrated that the coating system within the scope of the invention can form a cured film which is excellent as refinish coating.

Japanese Patent Application No. 2013-238812 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for repairing a damaged area of a silicone hard-coat layer on an automotive resin glazing substrate, comprising:
   (I) applying an intermediate coating composition to the damaged area, thereby burying irregularities in the damaged area;
   (II) applying a topcoat coating composition to the intermediate coating composition; and
   (III) curing both coating compositions,
   wherein the intermediate coating composition comprises:
      (A) 100 parts by weight of a reactive siloxane compound,
      (B) 1-50 parts by weight of silica, and
      has a viscosity of 1,000 to 200,000 mPa·s, and
   wherein the topcoat coating composition comprises:
      (C) 1-25 parts by weight of an alkoxysilane having a UV-absorbing functional group,
      (D) 20-70 parts by weight of a multifunctional alkoxysilane,
      (E) 20-70 parts by weight of a reactive siloxane compound,
      (F) 1-50 parts by weight of colloidal silica, and
      (G) 0.5-20 parts by weight of phosphoric acid, per 100 parts by weight of components (C) to (G) combined.

2. The method of claim 1 wherein the silicone hard coat layer is formed from a composition comprising:
   a polysiloxane obtained from hydrolytic condensation of at least one hydrolyzable silicon compound having the formula (i):

$$R'_p SiX'_{(4-p)} \quad (i)$$

wherein R' is a monovalent organic group of 1 to 18 carbon atoms, X' is a hydrolyzable group, and p is an integer of 0 to 2, with the proviso that solely p=0 and solely p=2 are excluded;
   a mixture of said polysiloxane and a microparticulate metal oxide;
   a polysilazane obtained from reaction of at least one hydrolyzable silicon compound having the formula (ii) with ammonia:

$$R''_q SiX''_{(4-q)} \quad (ii)$$

wherein R'' is a monovalent organic group of 1 to 18 carbon atoms, X'' is a hydrolyzable group, and q is an integer of 0 to 2;
   or a mixture of said polysilazane and a microparticulate metal oxide.

3. The method of claim 1, wherein any extra of the intermediate coating composition is removed after step (I).

4. The method of claim 1, wherein component (A) is an alkoxysiloxane having the average compositional formula (1):

$$R^1{}_b\text{—Si}(OR^2)_c(OH)_dO_{(4-b-c-d)/2} \quad (1)$$

wherein $R^1$ is each independently a substituted or unsubstituted $C_1$-$C_{10}$ alkyl group or aryl group, $R^2$ is a monovalent hydrocarbon group of 1 to 6 carbon atoms, b, c and d are numbers meeting the range: $1 \leq b < 2$, $0.1 \leq c \leq 3$, $0 \leq d < 0.5$, and $1.1 \leq b+c+d \leq 4$, and
   component (B) is fumed silica having a BET specific surface area of 100 to 400 m²/g.

5. The method of claim 1, wherein component (C) is an alkoxysilane having the formula (2):

(2)

wherein Z is a $C_2$-$C_6$ alkylene group, $R^3$ and $R^4$ are each independently a $C_1$-$C_5$ alkyl group, Y is each independently hydrogen, $C_1$-$C_{10}$ alkyl group, $C_6$-$C_{10}$ aryl group, hydroxyl group or halogen atom, and a is 0 or 1,
   component (D) is an alkoxysilane having the formula (3):

$$R^5{}_e Si(OR^6)_f \quad (3)$$

wherein $R^5$ is each independently a substituted or unsubstituted monovalent hydrocarbon group of 1 to 10 carbon atoms, $R^6$ is each independently a $C_1$-$C_5$ alkyl group, e and f are numbers meeting the range: $0 \leq e \leq 2$, $2 \leq f \leq 4$, and e+f=4, component (E) is a siloxane compound having the formula (4):

$$R^7{}_g\text{—Si}(OR^8)_h(OH)_iO_{(4-g-h-i)/2} \quad (4)$$

wherein $R^7$ is each independently a substituted or unsubstituted $C_1$-$C_{10}$ alkyl group or aryl group, $R^8$ is a monovalent hydrocarbon group of 1 to 6 carbon atoms, g, h and i are numbers meeting the range: $1 \leq g < 2$, $0.1 \leq h \leq 3$, $0 \leq i < 0.5$, and $1.1 \leq g+h+i \leq 4$.

6. The method of claim 1, wherein the resin glazing substrate is an automotive resin glazing substrate comprising a transparent plastic substrate of polycarbonate, polymethyl methacrylate or polystyrene.

* * * * *